United States Patent
Brahmadathan et al.

(10) Patent No.: US 9,471,094 B1
(45) Date of Patent: Oct. 18, 2016

(54) METHOD OF ALIGNING TIMING OF A CHIP SELECT SIGNAL WITH A CYCLE OF A MEMORY DEVICE

(71) Applicant: CADENCE DESIGN SYSTEMS, INC., San Jose, CA (US)

(72) Inventors: Sandeep Brahmadathan, Bangalore (IN); Jeffrey Scott Earl, San Jose, CA (US); Todd Barth, Milpitas, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 196 days.

(21) Appl. No.: 14/585,548

(22) Filed: Dec. 30, 2014

(51) Int. Cl.
*G06F 1/12* (2006.01)
*G06F 1/08* (2006.01)

(52) U.S. Cl.
CPC .. *G06F 1/12* (2013.01); *G06F 1/08* (2013.01)

(58) Field of Classification Search
CPC .................................. G06F 1/08; G06F 1/12
USPC ................................................. 713/401, 503
See application file for complete search history.

(56) References Cited

U.S. PATENT DOCUMENTS

| 5,408,641 A * | 4/1995 | Gagliardo | G06F 13/4243 703/23 |
| 6,448,826 B1 * | 9/2002 | Ooishi | G06F 1/12 327/153 |
| 8,736,339 B2 * | 5/2014 | Kawaoka | G06F 1/06 327/163 |

* cited by examiner

*Primary Examiner* — Thuan Du
(74) *Attorney, Agent, or Firm* — Rosenberg, Klein & Lee (57) ABSTRACT

A chip select signal is trained where the chip select signal is delayed to centrally align its pulses with a positive edge of a memory device's clock cycle. Over repeated iterations, the memory device stops its clock for an interval and a delayed pulse of the chip select signal is generated. The pulse delay is incrementally changed with each iteration. When the delay results in the trailing edge of the delayed pulse aligning with the positive edge of the last cycle before the stoppage interval, the memory device captures the contents of a computer bus, thus detecting a trailing edge delay value. When the delay results in the leading edge of the delayed pulse aligning with the positive edge of the last cycle, the device no longer captures the contents, thus detecting a leading edge delay value. A value between these values is then set as the optimal delay.

20 Claims, 9 Drawing Sheets

METHOD OF ALIGNING TIMING OF A CHIP SELECT SIGNAL WITH A CYCLE OF A MEMORY DEVICE

BACKGROUND OF THE INVENTION

The subject system and method are generally directed to training a chip select signal to calibrate its timing so that it is synchronized with that of a memory clock of a chip. In particular, the subject method is directed to devices where a chip select signal may be trained such that a pulse of a chip select signal is delayed to align with the positive edge of a dynamic random-access memory (DRAM) clock cycle, using an ability of the DRAM to allow stopping its clock input temporarily around the pulse of the chip select signal.

Digital devices and circuits may have numerous computer chips, such as RAM chips, connected to a single computer bus. When a signal or instruction in the bus is meant for a subset of the chips (usually one), a chip select signal associated with the bus may be used to place that subset of chips in an active state while leaving the remaining chips in an inactive state. The active chip or chips will then receive and respond to the signal or instruction, while the inactive chip or chips will ignore the same signal or instruction, and furthermore will not produce outputs in response.

Some recent designs in devices using DRAM chips require that a chip select signal must be "trained" for use with the DRAM before the associated bus may command high-frequency operations of the DRAM, to ensure efficiency and reduce error. Until the training is achieved, the DRAM is limited to low-frequency operations. This training can include synchronizing signals of the chip select to the cycle of the DRAM's memory clock, to maximize the strength and effectiveness of the signal, and ensure that high-frequency operations may occur without loss or error in the chip select signal.

To assist in this training, some DRAM devices provide methods to stop the memory clock of the DRAM for a selected interval during the training. Such methods can be found in the Low Power Double Data Rate 4 (LPDDR4) Specification, December 2013.

Due to the recent development of this requirement to align the chip select signal with the memory clock, present methods of training the chip select signal are limited and not tailored to the requirement. There is therefore a need for a more effective method of chip select signal training, which will result in improved synchronization and a smaller error rate even at high frequencies.

SUMMARY OF THE INVENTION

It is an object of the disclosed system and method to provide a system and method for determining an optimal delay value of a chip select signal in relation to a clock of a device, such as a memory device containing one or more DRAM chips.

It is another object of the disclosed system and method to provide a system and method for training a chip select signal to interact with a device, such as a memory device containing one or more DRAM chips.

While not limited thereto, a disclosed embodiment is directed to a method of determining an optimal delay value $D_O$ of a chip select signal in relation to a device, the method including setting a iterative delay value $D_i$; determining a trailing edge delay value $D_T$; determining a leading edge delay value $D_L$; and setting the optimal delay value $D_O$ to a value that is intermediate that of $D_T$ and $D_L$.

According to an aspect of the disclosed system and method, the trailing edge delay value $D_T$ is determined by stopping the device clock signal for a first stoppage interval, applying the iterative delay value $D_i$ to the timing of a pulse of the chip select signal, determining whether a trailing edge of the pulse has aligned with a positive edge of a cycle of the clock signal, decrementing the iterative delay value $D_i$ and restarting the operation if the trailing edge of the pulse has not aligned with the positive edge of the cycle, and setting the trailing edge delay value $D_T$ to the iterative delay value $D_i$ if the trailing edge of the pulse has aligned with the positive edge of the cycle.

According to an aspect of the disclosed system and method, the leading edge delay value $D_L$ is determined by stopping the device clock signal for a second stoppage interval, applying the iterative delay value $D_i$ to the timing of a pulse of the chip select signal, determining whether a leading edge of the pulse has aligned with a positive edge of a cycle of the clock signal, decrementing the iterative delay value $D_i$ and restarting the operation if the leading edge of the pulse has not aligned with the positive edge of the cycle, and setting the leading edge delay value $D_L$ to the iterative delay value $D_i$ if the leading edge of the pulse has aligned with the positive edge of the cycle, setting the leading edge delay value $D_L$ to the iterative delay value $D_1$.

While not limited thereto, a disclosed embodiment is directed to a method of training a chip select (CS) to interact with a device, the method including using the above method of determining an optimal delay value $D_O$; and applying the optimal delay value $D_O$ to the timing of one or more subsequent operations of the chip select signal.

While not limited thereto, a disclosed embodiment is directed to a system for training a chip select (CS) to interact with a device, the system comprising a memory controller coupled to the device by a CS signal line and at least one computer bus, the memory controller comprising: a CS delay chain configured to apply a selected delay D to a CS clock signal; a CS transfer logic coupled to the CS delay chain and configured to time a CS signal to the according to the delayed CS clock signal; and a control processor coupled to the CS delay chain to provide the selected delay D, and configured to determine an initial value for an iterative delay value $D_i$, determine a trailing edge delay value $D_T$, determine a leading edge delay value $D_L$, and set an optimal delay value $D_O$ to a intermediate value between that of $D_T$ and $D_L$, which may be the midpoint between $D_T$ and $D_L$.

According to an aspect of the disclosed system and method, the trailing edge delay value $D_T$ is determined by signaling the device to stop the device clock signal for a first stoppage interval, providing the iterative delay value $D_i$ as the selected delay D to the CS delay chain during a pulse of the CS signal, determining whether a trailing edge of the pulse has aligned with a positive edge of a cycle of the device clock signal, decrementing the iterative delay value $D_i$ and restarting the operation if the trailing edge of the pulse has not aligned with the positive edge of the cycle, and setting the trailing edge delay value $D_T$ to the iterative delay value $D_i$ if the trailing edge of the pulse has aligned with the positive edge of the cycle.

According to an aspect of the disclosed system and method, the leading edge delay value $D_L$ is determined by signaling the device to stop the device clock signal for a second stoppage interval, providing the iterative delay value $D_i$ as the selected delay D during an additional pulse of the CS signal, determining whether a leading edge of the additional pulse has aligned with a positive edge of a cycle of the clock signal, decrementing the iterative delay value $D_i$ and restarting the operation if the leading edge of the additional pulse has not aligned with the positive edge of the cycle, and setting the leading edge delay value $D_L$ to the iterative delay value $D_i$ if the leading edge of the additional pulse has aligned with the positive edge of the cycle.

Additional aspects, details, and advantages of the disclosed system and method will be set forth, in part, in the description and figures which follow.

DETAILED DESCRIPTION OF THE EMBODIMENTS

Reference will now be made in detail to exemplary embodiments, which are illustrated in the accompanying drawings, wherein like reference numerals refer to the like elements throughout. The embodiments are described below in order to explain the disclosed system and method by referring to the figures.

Figure 1:
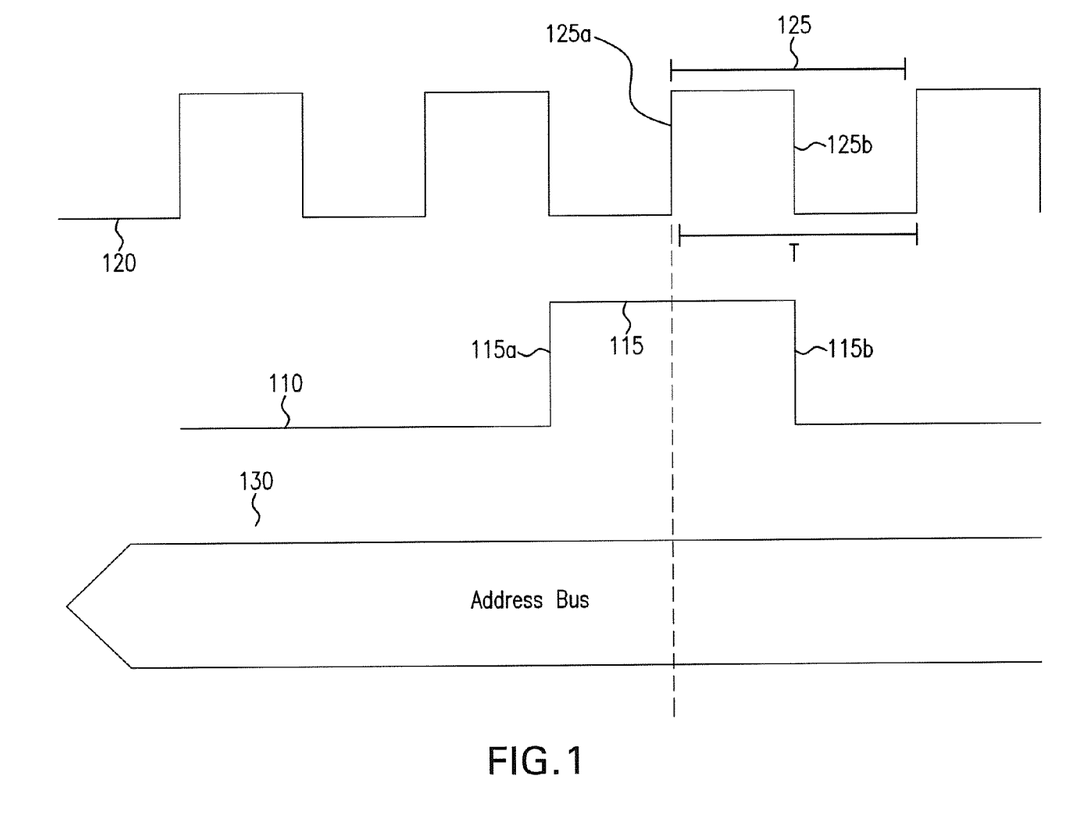
FIG. 1 is a timing diagram depicting a desirable result of training a chip select signal to align with a memory clock signal.

FIG. 1 is a timing diagram depicting a desirable result of a chip select training process, where the chip select signal is centrally aligned with a positive edge of the memory clock signal, in the disclosed system and method.

As shown in FIG. 1, a chip select (CS) signal 110 comprises a pulse 115 of the signal for one cycle of the signal, the pulse 115 having a trailing edge 115a and a leading edge 115b. A memory clock signal 120 associated with a memory device (not depicted in FIG. 1) comprises numerous cycles such as cycle 125, each of period T. The memory device may comprise one or more dynamic random-access memory (DRAM) chips. When the pulse 115 is active during a positive edge of a cycle of the memory clock signal 120, this activates one or more chips in the memory device, instructing them to read the data on a computer bus 130, such as an address bus. In the alignment depicted in FIG. 1, the pulse 115 is centrally aligned with a positive edge 125a of cycle 125; that is, the positive edge 125a falls precisely between the trailing edge 115a and the leading edge 115b. This alignment maximizes the setup and hold margins for the CS signal 110 in relation to the cycle 125, and minimizes the timing issues, ensuring that the pulse 115 is received by the device and the data is properly retrieved.

Figure 2A:
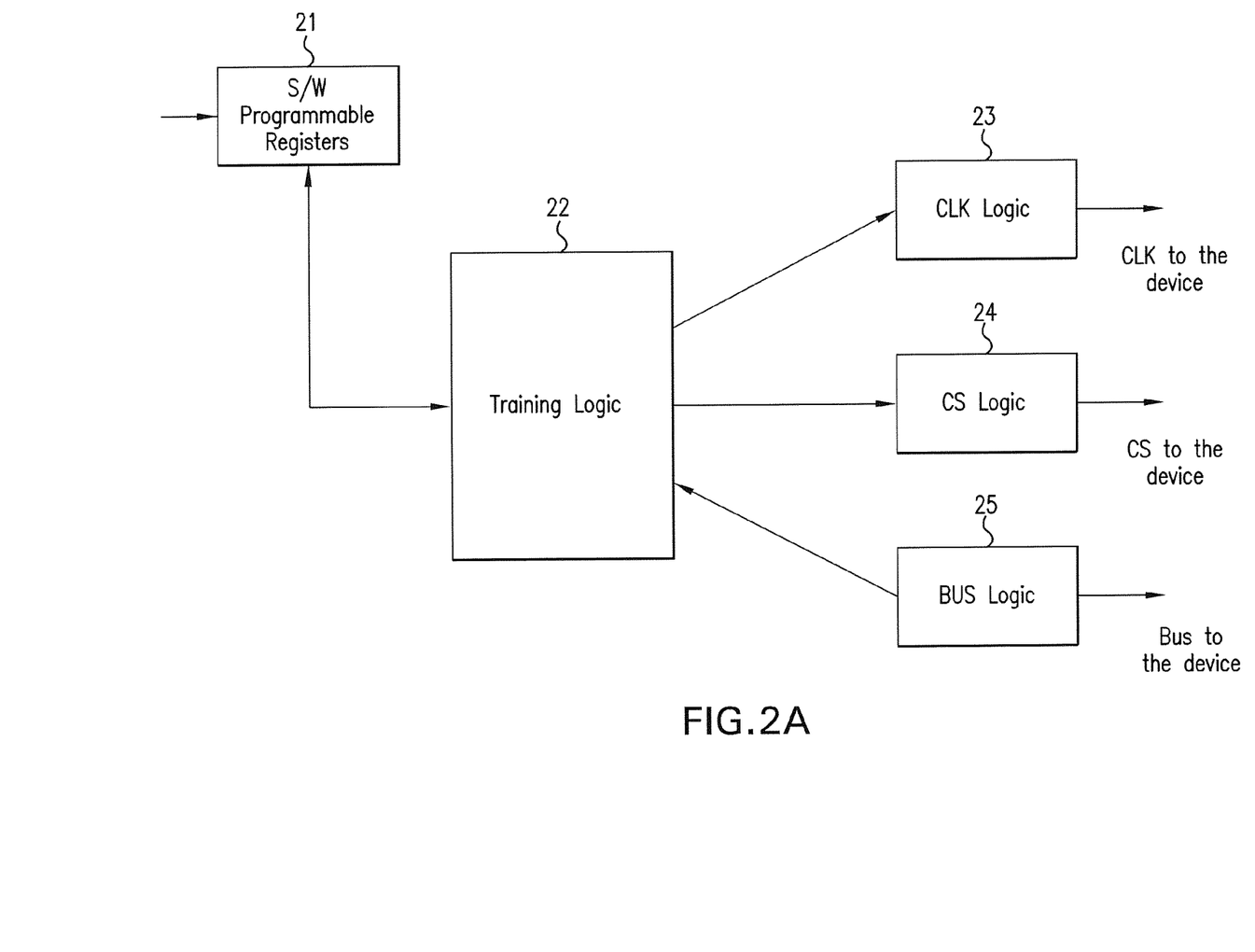
FIG. 2A is a block diagram of a training logic system.

FIG. 2A is a block diagram of a training logic system, for the disclosed system and method. In FIG. 2A, one or more software-programmable registers 21 may be programmed with operational parameters instructions, and other data. Furthermore, the registers 21 are in communication with a training logic 22, which may relay the data of the registers 21 to a clock logic 23, a CS logic 24, and a bus logic 25. Specifically, the hardware training logic 20 may provide a clock gate enable/disable signal 121 to the clock logic 23, and may provide a delay value D, which is a length of time, to the CS logic 24 and the bus logic 25. The clock logic 23, CS logic 24, and bus logic 25 may be modules within or coupled to the training logic 22.

The software, and other necessary instructions, may be encoded as processing instructions on a non-transitory computer-readable medium, and may be executed on one or more processors, in concert with an operating system or other suitable measures. The training logic 22, clock logic 23, CS logic 24, and bus logic 25 may be implemented as software instructions encoded on a non-transitory computer-readable medium, or as circuits or other hardware.

Figure 2B:
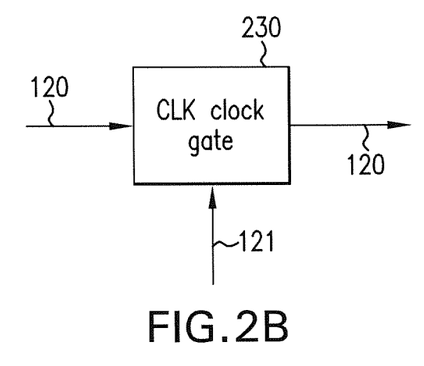
FIG. 2B is a detailed block diagram of the clock logic of FIG. 2A.
Figure 2C:
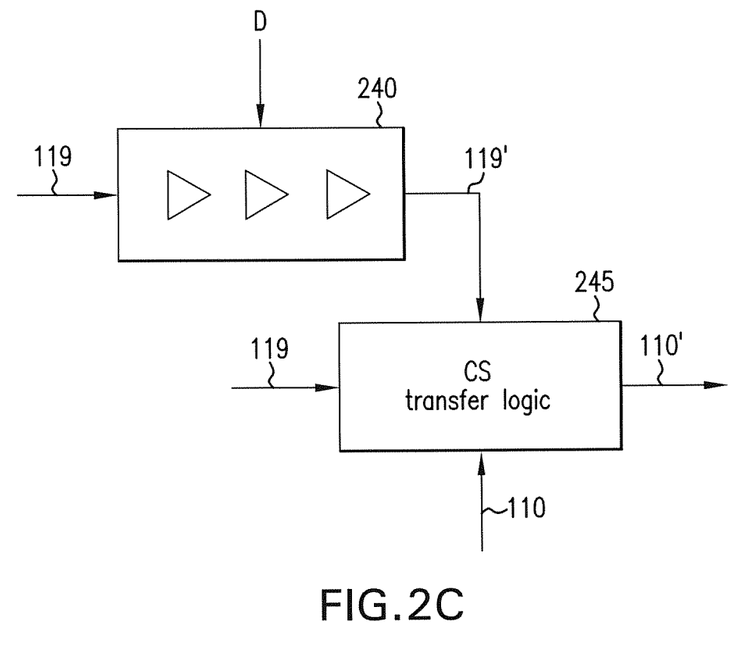
FIG. 2C is a detailed block diagram of the CS logic of FIG. 2A.

FIG. 2B is a detailed block diagram of the clock logic 23 of FIG. 2A. In FIG. 2B, a memory clock signal 120 is received by a clock gate 230, along with a memory clock gate enable/disable signal 121. If the memory clock gate enable/disable signal 121 enables the clock gate 230, the memory clock signal 120 is passed to the memory device unimpeded. If the memory clock gate enable/disable signal 121 disables the clock gate 230, the memory clock signal 120 is stopped—that is, it does not cycle between positive and negative edges but remains a "flat" signal at a zero value—until the clock gate 230 is enabled again, creating a stoppage interval in the memory clock signal 120 as received by the memory device. The methods and systems disclosed herein are only applicable to memory devices that will support stoppage of the memory clock immediately after the assertion of the chip select signal. In some exemplary systems, if no memory clock gate enable/disable signal 121 is received by the clock gate 230, the memory clock signal 120 is passed to the memory device unimpeded FIG. 2C is a detailed block diagram of the CS logic 24 of FIG. 2A. In FIG. 2C, a CS clock signal 119 is passed through a CS delay chain 240. The CS delay chain 240 may also receive a delay value D, which is a length of time; if it does, it outputs a delayed CS clock signal 119', which has been delayed in its timing by the delay value D to a CS transfer logic 245. In some exemplary systems, if no delay value D is received, the CS delay chain 240 outputs the CS clock signal 119 without alteration, while in others, if no delay value D is received, the CS delay chain 240 provides no output.

The CS transfer logic 245 receives the CS signal 110, and the CS clock signal 119. It then outputs the CS signal 110 to a device, such as a memory device or memory chip, according to the CS clock signal 119. However, if the transfer logic 245 also receives a delayed CS clock signal 119' from the CS delay chain 240, it instead outputs a delayed CS signal 110' to the device according to the delayed clock signal 119'. In some exemplary systems, the CS transfer logic 245 does not receive the CS clock signal 119 directly, but in all instances relies on the output of the CS delay chain 240, which provides an unaltered CS clock signal 119 when no delay value D is received.

The bus logic 250 is comparable to the CS logic 240 of FIG. 2C, and contains a comparable arrangement of bus delay chain, bus transfer logic, incoming signals from the training logic 220, and outgoing signals to the computer bus 130. Therefore, a depiction has been omitted as repetitive, but can be easily envisioned by those of skill in the art.

Figure 2D:
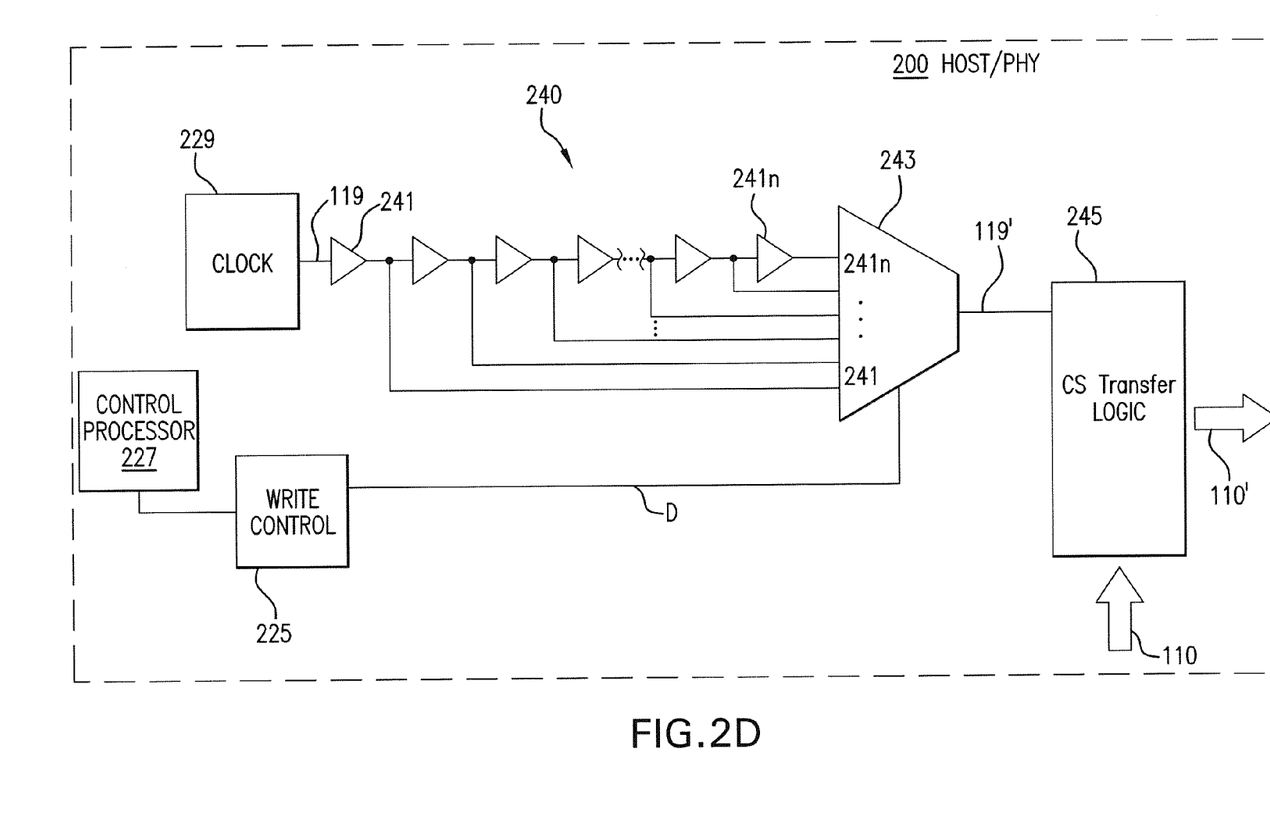
FIG. 2D is a block diagram of a memory controller with a delay circuit on a chip select line.

FIG. 2D is a block diagram of a memory controller with a delay circuit on a chip select line. FIG. 2D represents a possible hardware implementation of the CS logic 24 and related components in the training logic 22, and may be further understood with reference to FIG. 2A and FIG. 2C.

As shown in FIG. 2D, a host memory controller, or PHY (physical access) 200 (terms used interchangeably herein) interacts with a control processor (not depicted) that controls the write training process, as well as the write functions of the memory controller 200. The memory controller 200 includes a delay chain 240 implemented as a selective delay circuit, which may employ a plurality of buffer or other logic devices 241 . . . 241$_n$ as a delay line to delay the CS clock signal 119. The selective delay circuit 240 includes a tap selection circuit 243, which may, for example, be implemented by a multiplexer, or other suitable circuit, to selectively tap the delay line formed by the plurality of serially arranged logic devices. Accordingly, the CS clock signal 119, provided from a clock 229, is input to the selective delay circuit 240. Responsive to a delay value D output from a write control circuit 225, under the control of the control processor 227 coupled thereto, the tap selection circuit 243 outputs a delayed CS clock signal 119' to the CS transfer logic circuit 245. By that arrangement, the memory controller 200 can selectively delay the CS signal 110 and output a delayed CS signal 110'.

The write control circuit 225 in the memory controller 200 may select the amount of delay D through tap selection circuit 243 by, in the depicted embodiment, choosing an input in the multiplexer from buffer outputs 241-241$_n$. In such manner, responsive to the delay value D, the selective delay circuit 240 applies a selected delay D to the clock signal 119 to be output from the delay circuit 240 as delayed clock signal 119', input to the CS transfer logic 245 to output the CS signal 110 as a delayed signal 110' to the memory device. In some exemplary systems, the write control circuit 225 is not present, and the tap selection circuit receives a signal providing the selected delay D directly from the control processor.

The memory controller 200 may also, in some exemplary systems, include the clock logic 23 and the bus logic 25. Also, although depicted as a separate component in FIG. 2D, in some exemplary systems, the control processor may also be incorporated into the memory controller 200.

It is noted that other or all elements of the training logic 22 may be implemented on the control processor. For instance, the control processor may provide the CS signal 110 to the CS transfer logic 245. The control processor may also be coupled to the clock logic 23 or the bus logic 25, and may send data and instruction to these components. The control processor may also receive data read from the memory device, which may be supplied through the memory controller 200.

While the circuit shown in FIG. 2D provides delay of the CS signal 110 for write operations, the same circuit may be employed with minimal alteration to delay signals to the bus 130. Furthermore, it is noted that a similar circuit may be employed to delay read operations from the memory device.

Figure 3A:
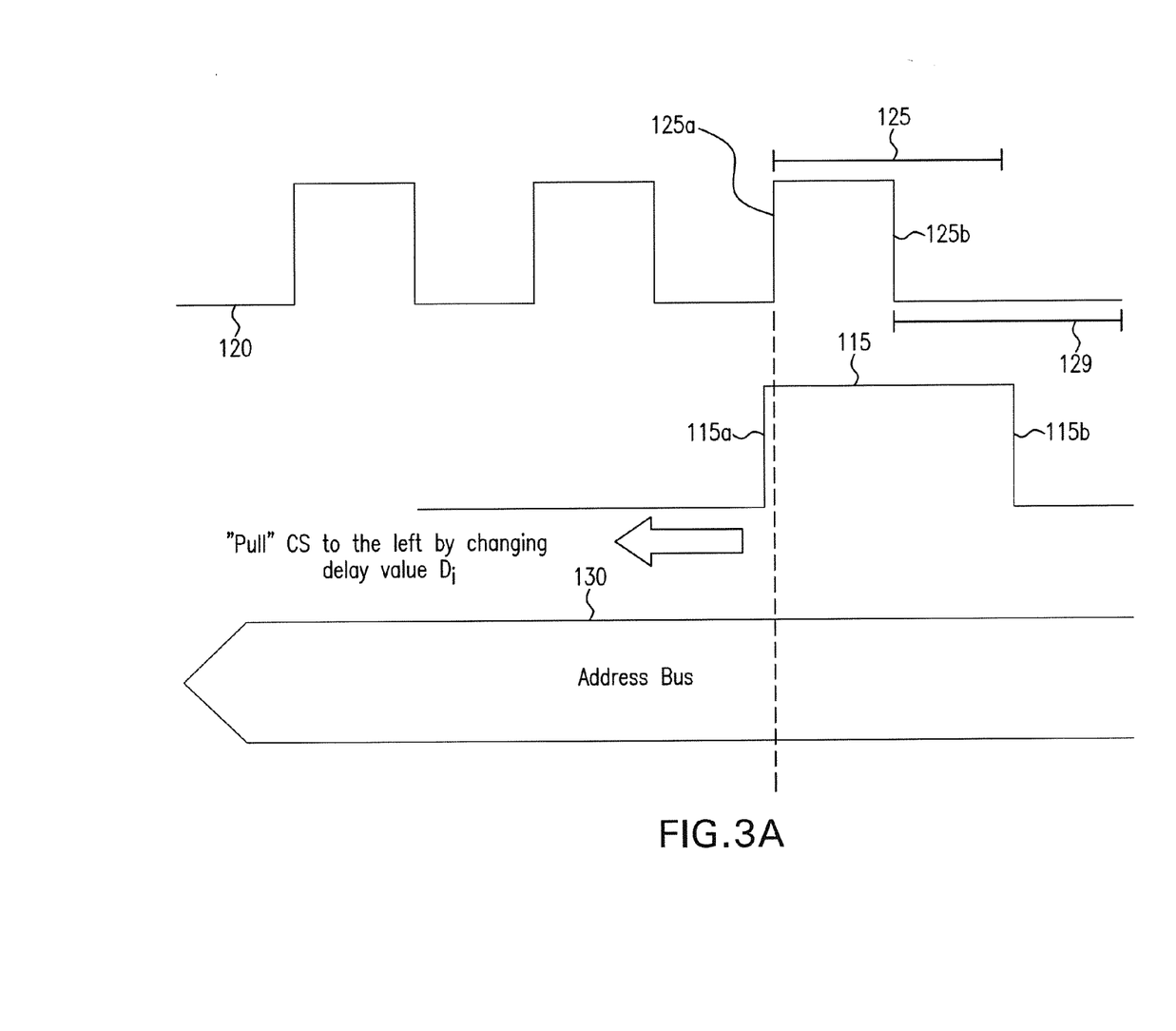
FIGS. 3A, 3B, and 3C are timing diagrams depicting a method of training the chip select signal.
Figure 3B:
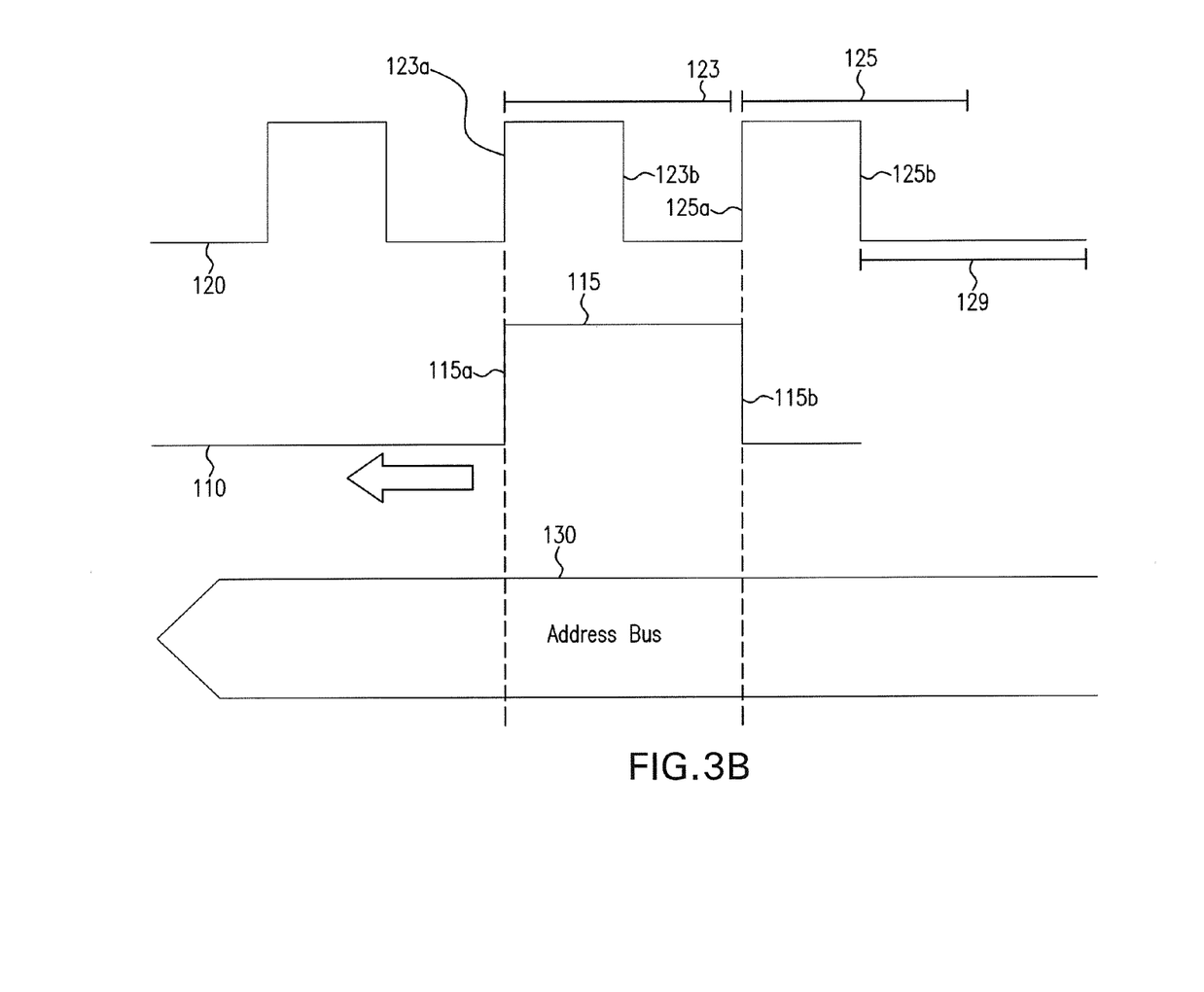
Figure 3C:
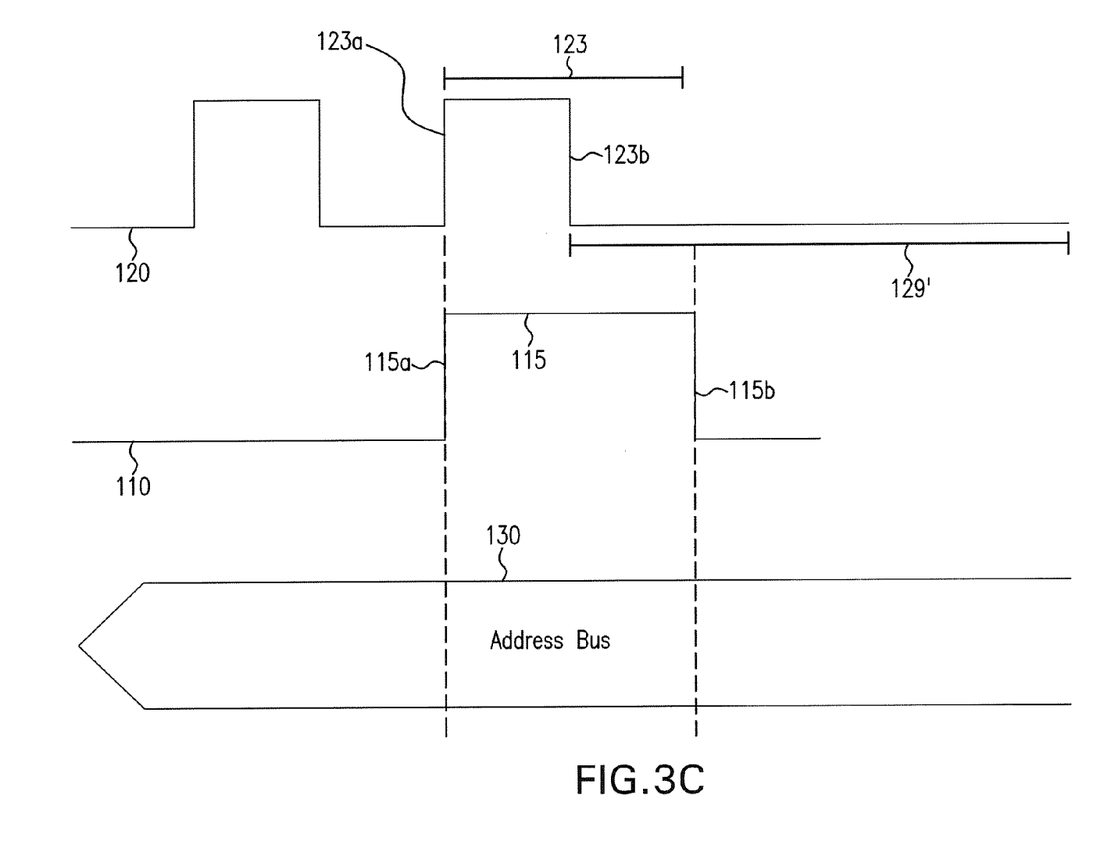

FIGS. 3A, 3B, and 3C are timing diagrams depicting a method of training the chip select (CS) signal to align a timing of a chip select signal 110 with a timing of a memory clock signal 120 of a memory device. The method is applicable to memory devices that provide an operation by which the memory clock signal 120 may be stopped for a designated interval, particularly during CS training.

Referring to FIG. 3A, first, a trailing edge detection process occurs. Using, for instance, the clock logic depicted in FIG. 2B, the memory clock signal 120 may be deliberately stopped for a specific interval. For the trailing edge detection process as depicted in FIG. 3A, the memory clock signal 120 is stopped immediately following a negative edge 125b of a cycle 125, creating a stoppage interval 129. The stoppage interval 129 may be of any duration convenient to the speed of the CS and the device, but should ideally be at least twice the period T of a cycle of the memory clock signal 120 for reasons that will become apparent. As the cycle immediately prior to the stoppage interval 129, cycle 125 and its positive edge 125a will be used as the alignment target for the CS signal 110.

Using, for instance, the CS logic depicted in FIG. 2C, the pulse 115 of the CS signal 110 may be deliberately delayed. For the trailing edge detection process as depicted in FIG. 3A, the pulse 115 is first delayed for an iterative delay value $D_i$. The initial value of $D_i$ may be equal to or greater than the period T of one cycle of the memory clock signal 120, such that the pulse 115 occurs completely during the stoppage interval 129. Because the pulse 115 does not occur during a positive edge of any cycle, no chips of the memory device are activated and the memory device receives no signal or instruction; that is, the test is in a "fail" state. In some exemplary systems, this lack of activation means that the memory device does not capture a value, such as an address value, present on the computer bus 130.

Both the clock stoppage of the memory clock signal 120 and the delay of the pulse 115 are then repeated, with the iterative delay value $D_i$ decremented by some fraction of T, for instance 0.05*T, with each iteration. A larger fraction of T will result in greater precision in the final result, while a smaller fraction of T will complete the training method faster. Therefore the decrementation should be selected at least in part based on need for precision.

This decrementation of the iterative delay value $D_i$ effectively moves the pulse 115 earlier in relation to the cycle 125, as shown by the arrow in FIG. 3A. The iterations of the trailing edge detection process continue until the trailing edge 115a of the pulse 115 aligns with the positive edge 125a of the cycle 125, which results in one or more of the chips of the memory device being placed in an active state for the duration of the pulse. This in turn puts the test in a "success" state.

In some exemplary systems, a success state may be detected by first storing a known trailing detection value, or pattern, $P_T$ in the computer bus 130, which the device will capture if the pulse 115 places one or more of its chips in an active state. $P_T$, and other detection values described further herein, may be address values. Following each pulse, the device returns its present value on a data line, and it is determined whether the returned value is $P_T$, that is, whether $P_T$ was successfully captured by the device. In at least a subset of these exemplary systems, a known initialization detection value $P_I$ different from the trailing detection value $P_T$ is first loaded into the device before the trailing edge detection process begins, to confirm that the trailing detection value $P_T$ will only be returned by the device in the event of a success state.

When a success state is detected, the trailing edge detection process determines that it has detected the trailing edge 115a, and completes by storing the present iterative delay value $D_i$ as a trailing delay value $D_T$.

A first stage of a leading edge detection process now occurs: the iterative delay value $D_i$ now continues to decrement for additional iterations as depicted in FIG. 3A, in tandem with additional clock stoppages for the memory clock signal 120. In most but not necessarily all exemplary systems, the same duration of the stoppage interval 129 will be used for the leading edge detection process as was used for the trailing edge detection process. When the leading edge 115b of the pulse 115 aligns with the positive edge 125a of the cycle 125, the memory device should now once again fail to activate any chips, because the pulse 115 does not occur during a positive edge of any cycle; that is, the test is again in a "fail" state.

If a fail state is detected, the leading edge detection process determines that it has detected the leading edge 115b, and completes by storing the present iterative delay value $D_i$ as a leading delay value $D_L$. Until then, the leading edge detection process repeats itself as the iterative delay value $D_i$ continues to decrement.

However, as depicted in FIG. 3B, the possibility exists that test could remain in a success state, even if the leading edge 115b has aligned with or even passed the positive edge 125a, because the trailing edge 115a has aligned with a positive edge 123a of a previous cycle 123. This can happen if the pulse 115 is itself inadvertently longer than T.

Therefore, to ensure that the leading edge detection process terminates, after each first stage, a second stage of the leading edge detection process occurs, according to the embodiment depicted in FIG. 3C. In the second stage, the same iterative delay value $D_i$ is used as in the first stage immediately prior, but the memory clock signal 120 is stopped one cycle earlier. Thus, cycle 125 and its positive edge 125a are "masked" by an earlier stoppage interval 129' in the second stage. The earlier stoppage interval 129' for the second stage may also be correspondingly longer than the stoppage interval 129 for the first stage; that is, 1*T longer.

If the success state in a given iteration of the first stage, with iterative delay value $D_i$, was due purely to the leading edge 115b not yet aligning with or passing the positive edge 125a of the cycle 125, the same iterative delay value $D_i$ will result in a fail state in the second stage due to the positive edge 125a being masked by the earlier stoppage interval 129'. However, if the success state in the first stage was (also) due to the trailing edge 115a aligning with the prior positive edge 123a, the same iterative delay value $D_i$ will still result in a success state in the second stage despite the positive edge 125a being masked.

If a success state is detected in the second stage, the leading edge detection process terminates early and stores the present iterative delay value $D_i$ as a leading delay value $D_L$, without detecting the actual leading edge 115b. Although this result for $D_L$ will only result in an approximation of the optimal alignment as depicted in FIG. 1, it is simple to implement and will still result in a moderately aligned chip select signal, as will be seen below.

In at least one embodiment, a final iteration of the second stage may occur where the iterative delay value $D_i$ is incremented, rather than decremented, and it is confirmed that the incremented iterative delay value $D_i$ does not trigger a success state. The leading delay value $D_L$ may then be set to either the present (incremented) iterative delay value $D_i$ or the previous (not incremented) iterative delay value $D_{i-1}$.

The success state for the leading edge detection process may be detected in a similar manner as was used for the trailing edge detection process, but certain variations will be necessary. In exemplary systems which use the approach of loading a known value in the computer bus 130, a new detection value such as a leading detection value $P_{Li}$ must be loaded in the computer bus 130 must be loaded in the address bus for the first stage, and then for each second stage. It is sufficient to use two such values—e.g. detection values $P_{L1}$ and $P_{L2}$—where $P_{L1}$ and $P_{L2}$ are alternated for each iteration of the first stage, and the alternate of the value used in each first stage is used in the corresponding second stage. That is to say, the detection values present in the buffer before each stage would be First Stage: $P_{L1}$, Second Stage: $P_{L2}$ First Stage: $P_{L2}$, Second Stage: $P_{L1}$, First Stage: $P_{L4}$, etc. (Obviously, after the first iteration of the first stage, the detection value in the bus 130 need only be changed for each second stage, and then may be left as is for the next first stage.) Specifically in the first iteration of the first stage, a success state is detected when $P_{L1}$ replaces the trailing detection value $P_T$; otherwise, a success state is detected whenever $P_{L1}$ replaces $P_{L2}$ or vice versa. In some exemplary systems, $P_{L1}$ may be the same as the initialization value $P_I$, and $P_{L2}$ may be the same as $P_T$.

Once both the trailing and leading edge detection processes have completed and both $D_T$ and $D_L$ have been determined, an optimal delay value $D_O$ is calculated as an intermediate value between $D_T$ and $D_L$. Such optimal $D_O$ delay value may be determined in any manner, as would be known to one of skill in the art, such as by adding $D_T$ and $D_L$ and dividing by 2 to establish a mean or average value. Any other suitable measures for determining an optimal delay value may be employed. Also, while it is preferable to use the optimal delay value that mean or average value between $D_T$ and $D_L$, any delay value between $D_T$ and $D_L$ may be employed as a suitable delay value. A suitable delay value is one that gives ample timing margin and tolerance to ensure reliable data capture—even at steadily increasing clock-rates expected in the future while accounting for various asymmetric routing and placement configurations. An optimal delay value is one where the timing margins and tolerances are substantially maximized.

The optimal delay value $D_O$, or other suitable delay value, may then be applied to all future, post-training interactions of the CS signal 110 with the memory device. If the leading edge detection process terminated in the first stage, applying the optimal delay value $D_O$ will result in the alignment of FIG. 1. If the leading edge detection process terminated in the second stage, applying the optimal delay value $D_O$ will still result in at least 0.5*T of the adjusted pulse 115 to either side of the positive edge 125a.

Figure 4:
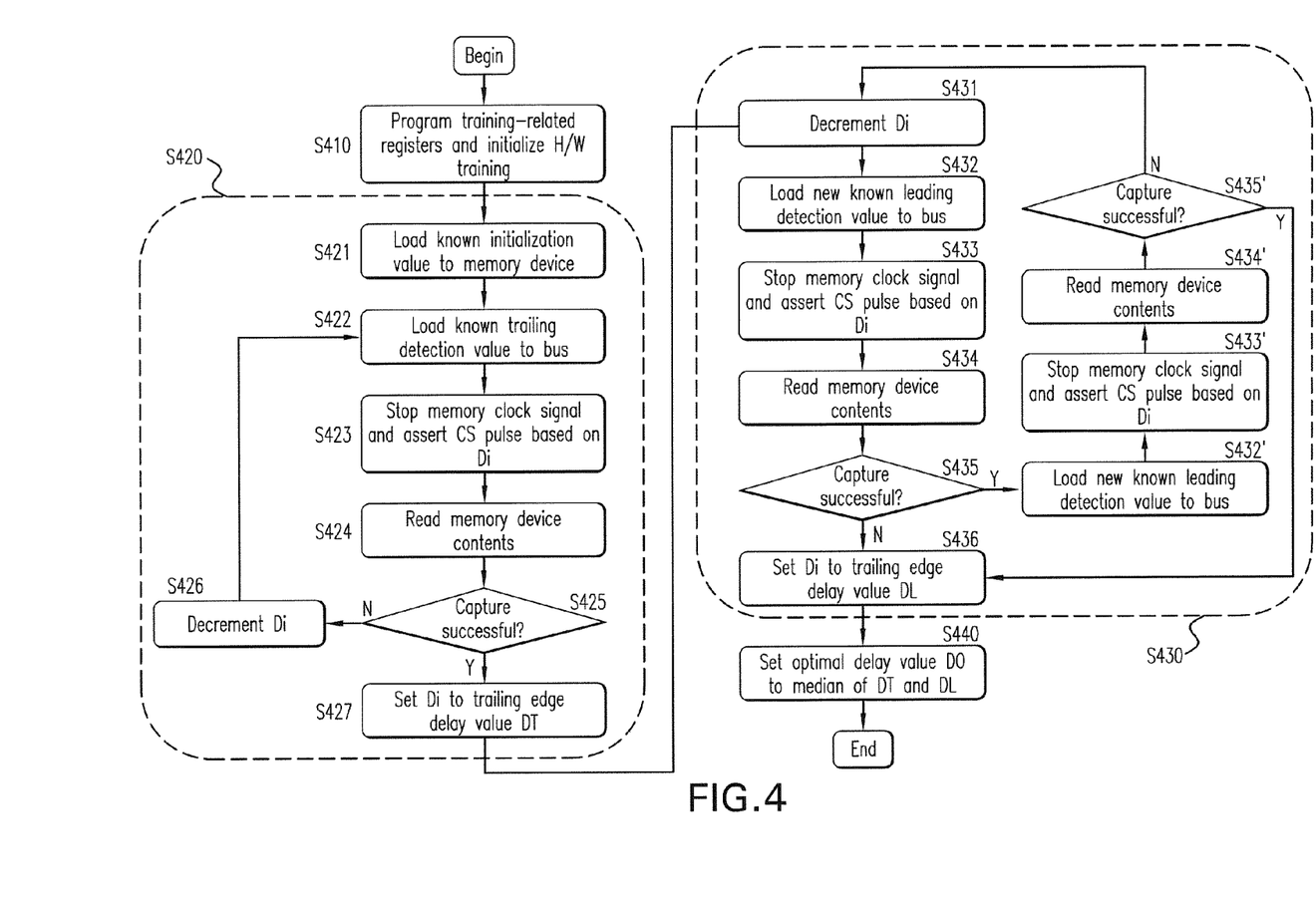
FIG. 4 is a flowchart depicting a method of training the chip select signal.

FIG. 4 is a flowchart depicting a method of calibrating a chip select (CS) signal, adjusting the timing of a chip select signal 110 to align with a timing of a memory clock signal 120 of a memory device. The method is applicable to systems that support an operation, either by the memory device or by a device controlling the training, by which the memory clock signal 120 may be stopped for a designated interval, particularly during CS training. Comparison to the timing diagrams of FIGS. 3A, 3B, and 3C may be helpful in understanding the method.

Referring to FIG. 4, at S410, a training software programs one or more registers 210, and initializes a hardware training in a training logic 220. The initialization may include setting an iterative delay value $D_i$, which is a time value, as well as one or more detection values, the purposes of which will be elaborated on further herein.

At S420, a trailing edge detection process detects a trailing edge of a chip select signal, and stores a trailing delay value $D_T$ thereof.

Specifically, in at least some exemplary systems, at S421, a known initialization detection value $P_I$ is loaded to the memory device. In some exemplary systems, this may be done by loading $P_I$ to a computer bus 130, then asserting the CS signal 110 in a normal fashion, for one or more cycles of the memory clock signal 120, to instruct the memory device to load the contents of the computer bus 130.

At S422, a known trailing detection value $P_T$ is loaded to the computer bus 130. In some exemplary systems, the memory clock signal 120 may also be allowed to continue for one or more cycles.

At S423, the memory device stops the memory clock signal 120 immediately following a negative edge 125b of a cycle 125 of the memory clock signal 120, for a stoppage interval 129. The stoppage interval 129 may be of any duration convenient to the speed of the CS and the device, but should ideally be at least twice the period T of a cycle of the memory clock signal 120.

Meanwhile, the CS signal 110 asserts a pulse 115 with an iterative delay value $D_i$ applied to delay the pulse 115, relative to a positive edge 125a of the cycle 125. The initial value of $D_i$ for the first iteration of S423 may be equal to or greater than the period T of one cycle of the memory clock signal 120, such that the pulse 115 occurs completely during the stoppage interval 129.

For the first iteration of S423, because the pulse 115 does not coincide with a positive edge of any cycle, no chips of the memory device are activated and the memory device receives no signal or instruction; therefore the memory device does not capture $P_T$ and instead continues to contain $P_I$. In later iterations, if the pulse 115 coincides with a positive edge of any cycle, $P_T$ will be captured by the memory device and will replace $P_I$.

At S424, the memory device is read, and at S425 it is determined whether the memory device successfully captured $P_T$. If the capture was unsuccessful, the iterative delay value $D_i$ is decremented by some fraction of T, for instance 0.05*T, at S426, and the method then returns to S422 for another iteration of the trailing edge detection process. A larger fraction of T will result in greater precision in the final result, while a smaller fraction of T will complete the training method faster.

If the capture was successful, however, it is determined that the trailing edge 115a has been found—that is, it has aligned with or passed the positive edge 125a—and the method sets the present iterative delay value $D_i$ as a trailing delay value $D_T$ at S427. This will complete the trailing edge detection process S420.

At S430, a leading edge detection process detects a leading edge of a signal of the chip select, and stores a leading delay value $D_L$ thereof.

Specifically, in at least some exemplary systems, at S431, the iterative delay value $D_i$ from the trailing edge detection process S420 is further decremented by some fraction of T, for instance 0.05*T. A larger fraction of T will result in greater precision in the final result, while a smaller fraction of T will complete the training method faster. In most but not necessarily all exemplary systems, the same fraction of T will be used for S431 as was used for S426. In some exemplary systems, for the first iteration of S431 only, the iterative delay value $D_i$ may be decremented by a larger fraction of T, for instance 0.5*T; this may accelerate the leading edge detection process S430, though it carries a risk of an inaccurate determination if the pulse 115 is shorter than the larger fraction of T.

At S432, a known first leading detection value $P_{L1}$, different from the trailing detection value $P_T$ presently on the memory device, is loaded to the computer bus 130. In some exemplary systems, the memory clock signal 120 may also be allowed to continue for one or more cycles.

It is noted that, on the iteration of S432 immediately following, $P_{L1}$ will be the detection value presently on the memory device, as will become clear. Therefore a known second leading detection value $P_{L2}$, different from the first leading detection value $P_{L1}$, will be loaded to the computer bus 130. Future iterations may continue to alternate between the two, or a new leading detection value $P_{L1}$ may be generated with each iteration, depending on the embodiment of the invention. The remainder of this description will assume an embodiment that alternates between $P_{L1}$ and $P_{L2}$.

As will also become clear, in some exemplary systems $P_{L2}$ will have already been loaded into the computer bus 130 on a previous iteration of S432' (described further below), and if so will not need to be loaded again, eliminating the need for S432 in later iterations of the leading edge detection process S430. Also, because $P_{L2}$ need only be different from $P_{L1}$, $P_{L2}$ may be the same value as $P_T$.

At S433, the memory device stops the memory clock signal 120 immediately following a cycle 125 of the memory clock signal 120, for a stoppage interval 129. The stoppage interval 129 may be of any duration convenient to the speed of the CS and the device, but should ideally be at least twice the period T of a cycle of the memory clock signal 120. In most but not necessarily all exemplary systems, the same duration of the stoppage interval 129 will be used for S433 as was used for S423.

Meanwhile, the CS signal 110 asserts a pulse 115 with the iterative delay value $D_i$ applied to delay the pulse 115, relative to a positive edge 125a of the cycle 125.

For the first iteration of S433, because the pulse 115 coincides with a positive edge 125a of cycle 125, the chips of the memory device are activated and the memory device captures $P_{L1}$, replacing $P_T$. In later iterations, if the pulse 115 does not coincide with a positive edge of any cycle, the detection value presently in the computer bus 130 will not be captured and the detection value presently in the memory device will not be replaced.

At S434, the memory device is read, and at S435 it is determined whether the memory device successfully captured the detection value in the address bus 130 (on the first iteration, $P_{L1}$). If the capture was successful, it is determined that the leading edge 115b has been found—that is, it has aligned with the positive edge 125a—and the method sets the present iterative delay value $D_i$ as a trailing delay value $D_L$ at S436. This will complete the leading edge detection process S430.

If the capture was unsuccessful, however, at S432' a known third leading detection value $P_{L3}$, different from the first leading detection value $P_{L1}$ presently on the memory device, is loaded to the computer bus 130. In some exemplary systems, $P_{L3}$ may be the $P_{L2}$ used in the next iteration of S432 through S435; as will become clear, if $P_{L2}$ is successfully captured before the next iteration of S432 through S435, said iteration will not occur, eliminating the possibility of confusion at S435 as to when $P_{L2}$ was captured. In other exemplary systems, a new leading detection value $P_{Li}$ may be generated with each iteration. The remainder of this description will assume an embodiment where $P_{L3}$ is $P_{L2}$.

It is noted that, in some exemplary systems, on the iteration of S432' immediately following, $P_{L2}$ will be the detection value presently on the memory device, having been captured in S434. Therefore a known fourth leading detection value $P_{L4}$, different from the first leading detection value $P_{L2}$, will be loaded to the computer bus 130. Because $P_{L4}$ need only be different from $P_{L2}$, $P_{L4}$ may be the same value as $P_{L1}$. Future iterations may continue to alternate between the two, or a new leading detection value $P_{Li}$ may be generated with each iteration, depending on the embodiment of the invention. The remainder of this description will assume an embodiment that alternates between $P_{L2}$ and $P_{L1}$.

At S433', the memory device stops the memory clock signal 120 immediately following a negative edge 123b of a prior cycle 123 of the memory clock signal 120, rather than immediately following the negative edge 125b of cycle 125, for an earlier stoppage interval 129'. That is, the earlier stoppage interval 129' must begin a cycle, or 1*T, earlier than the stoppage interval 129, "masking" cycle 125 and its positive edge 125a. The earlier stoppage interval 129' may be of any duration convenient to the speed of the CS and the device, but should ideally be at least two times the period T of a cycle of the memory clock signal 120, and may be exactly 1*T longer than the stoppage interval 129.

Meanwhile, the CS signal 110 asserts a pulse 115 with the iterative delay value $D_i$ applied to delay the pulse 115, relative to a positive edge 125a of cycle 125. Note that the iterative delay value $D_i$ which is applied has not been decremented since the last iteration of S433. However, unlike in S433, in S433' the earlier stoppage interval 129' has masked cycle 125 and its positive edge 125a. Therefore, if the chips of the memory device are activated and the memory device captures $P_{L2}$, replacing $P_{Li}$, it is because the pulse 115—more specifically, the trailing edge 115a—now coincides with a prior positive edge 123a of prior cycle 123. If this is the case, and the previous iteration of S433 also activated the chips of the memory device, then it can be seen that S435 will never fail to detect a capture, because the pulse 115 will either coincide with positive edge 125a or prior positive edge 123a (or an even earlier positive edge) for every iteration.

Therefore, at S434', the memory device is read, and at S435' it is determined whether the memory device successfully captured the detection value in the address bus 130 (on the first iteration, $P_{L2}$). If the capture was unsuccessful, the method returns to S431 for another iteration of the leading edge detection process, beginning by decrementing delay value $D_i$ again.

If the capture was successful, however, it is determined that the trailing edge 115a has aligned or passed prior positive edge 123a, and an accurate measurement of the leading edge 115b is not possible in this embodiment of the invention. Therefore, the method sets the present iterative delay value $D_i$ as a leading delay value $D_L$ at S436. While not the delay value which would align the leading edge 115b with the positive edge 125a, it will suffice for training purposes. This will complete the leading edge detection process S430.

At this point, both a trailing delay value $D_T$ and a leading delay value $D_L$ have been determined. At S440, an intermediate value between $D_T$ and $D_L$ is calculated, which preferably is the average or mean value between $D_T$ and $D_L$. This calculated value is set as an optimal delay value $D_O$, and is stored so it may be applied to future, post-training interactions of the CS signal 110 with the memory device. If the leading edge detection process terminated due to a lack of capture detected in S435, applying the optimal delay value $D_O$ to a post-training CS signal 110 will result in the alignment of FIG. 1. If the leading edge detection process terminated due to a capture detected in S435', applying the optimal delay value $D_O$ will still result in at least 0.5*T of the delayed pulse 115 to either side of the positive edge 125a.

In some exemplary systems, if the capture is unsuccessful at S435, the method does not proceed to S432', but returns directly to S431; that is, S432', S433', S434', and S435' are not part of the method in these exemplary systems. That is, S430 only completes when it is determined at S435 that the leading edge 115b has aligned with the positive edge 125a, after which S436 sets the present iterative delay value $D_i$ as a trailing delay value $D_L$ and the method proceeds to S440. These exemplary systems will fail to complete the method if the trailing edge 115b aligns or passes with a prior positive edge 123a of prior cycle 123 before the leading edge 115b aligns with the positive edge 125a of cycle 125, and may therefore require an abort operation (not depicted) that triggers after a number of iterations of S430 that is determined to be excessive. However, if it can be determined in advance that the pulse 115 is shorter than T by more than the fraction of T employed in S431, such an embodiment is more efficient, and will guarantee that the optimal delay value $D_O$ will always result in the alignment of FIG. 1.

Figure 5:
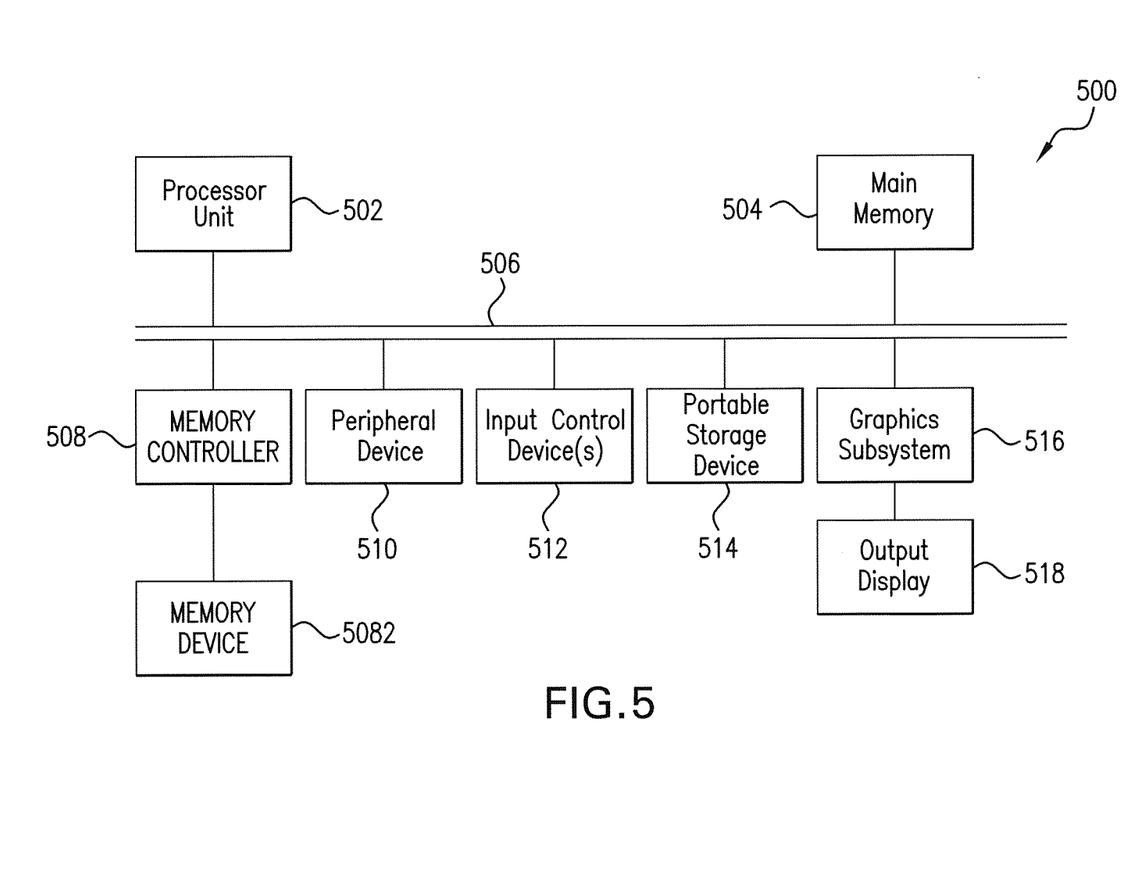
FIG. 5 is a block diagram depicting an exemplary computer system which may be employed to implement various aspects of the disclosed system and method.

FIG. 5 is a block diagram depicting an exemplary computer system for programmatic and/or hardware implementation of various aspects of the disclosed system and method. For instance, it may serve as a host for such hardware modules, and/or as a host for executing software modules such as EDA tools/simulations/emulation/firmware, in accordance with various configurations of the disclosed system and method.

A computer system 500 contains: a processor unit 502, a main memory 504, an interconnect bus 506, a memory controller 508 that is coupled to a memory device 5082, peripheral device(s) 510, input control device(s) 512, portable storage medium drive(s) 514, a graphics subsystem 516, and an output display 518. Processor unit 502 may include a single microprocessor or a plurality of microprocessors for configuring computer system 500 as a multi-processor system. Main memory 504 stores, in part, instructions and data to be executed by processor unit 502. Main memory 504 preferably includes banks of dynamic random access memory (DRAM) as well as high-speed cache memory.

For the purpose of simplicity, all the components of computer system 500 are connected via interconnect bus 506. However, computer system 500 may be connected through one or more data transport means. For example, processor unit 502 and main memory 504 may be connected via a local microprocessor bus; and memory controller 508, peripheral device(s) 510, portable storage medium drive(s) 514, and graphics subsystem 516 may be connected via one or more input/output (I/O) buses. Memory device 5082 may be implemented as a nonvolatile semiconductor memory for storing data and instructions to be used by processor unit 502. Memory device 5082 may store the software to load it to the main memory 504 or may be represented in an EDA tool simulation by suitable classes (incorporating data structures and functions operable upon the data structures) or the like as would be known to one of skill in the art.

Portable storage medium drive 514 operates to input and output data and code to and from the computer system 500. In one configuration, the software is stored on such a portable medium, and is input to computer system 500 via portable storage medium drive 514. Peripheral device(s) 510 may include any type of computer support device such as an input/output (I/O) interface, to add additional functionality to computer system 500. For example, peripheral device(s) 510 may include a network interface card, to interface computer system 500 to a network. Peripheral device(s) may also include a memory controller and nonvolatile memory.

Input control device(s) 512 provide a portion of the user interface for a computer system 500 user. Input control device(s) 512 may include an alphanumeric keypad for inputting alphanumeric and other key information; and a cursor control device such as a mouse, a trackpad or stylus; or cursor direction keys.

In order to display textual and graphical information, computer system 500 contains graphics subsystem 514 and output display(s) 518. Output display 518 may include a cathode ray tube (CRT) display, liquid crystal display (LCD), plasma, or active matrix organic light emitting diode (AMOLED) display. Graphics subsystem 516 receives textual and graphical information, and processes the information for output to display 518.

In a software implementation, the EDA software includes a plurality of computer executable instructions, to be implemented on a computer system. Prior to loading in a computer system, the EDA software may reside as encoded information on a computer-readable tangible medium such as a magnetic floppy disk, a magnetic tape, CD-ROM, DVD-ROM, or any other suitable computer readable medium.

In a hardware implementation, the invention may comprise a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) may also be developed to perform these functions.

Thereby, a training logic system and a memory device may expeditiously train a chip select to align pulses of a chip select signal with a clock signal of the memory device, to effect high speed reliable transfer to and from the memory device with great efficiency. The training method, through a unique process of methodically delaying a pulse of a chip select signal, can centrally align the pulse with a positive edge of a cycle of the memory clock signal; that is, at minimum the pulse provides at least half a cycle period of buffer on either side of the positive edge. The training method recognizes and accounts for signal arrangements where a pulse may trigger two cycles of the memory clock signal at once.

The above exemplary systems and their equivalents may be applied, with minor or no alteration, to any form of device with a clock cycle that may be stopped for an interval. This may include not only DRAM devices, but other forms of memory devices, and still other devices may also have this feature and require training to align its clock cycle with that of an outside signal.

The descriptions above are intended to illustrate possible implementations of the disclosed system and method and are not restrictive. While this disclosure has been made in connection with specific forms and embodiments thereof, it will be appreciated that various modifications other than those discussed above may be resorted to without departing from the spirit or scope of the claimed invention. Such variations, modifications, and alternatives will become apparent to the skilled artisan upon a review of the disclosure. For example, functionally equivalent elements or method steps may be substituted for the specifically shown and described, and certain features may be used independently of other features, and all or some of the above embodiments may be selectively combined with each other, and in certain cases, particular locations of elements or sequence of method steps may be reversed or interposed, all without departing from the spirit or scope of the invention as defined in the appended claims. The scope of the claims of the invention should therefore be determined with reference to the description above and the appended claims, along with their full range of equivalents.

What is claimed is:

1. A method of adjusting a timing alignment of a chip select signal with respect to a clock signal for communication to a device, the method comprising:
   setting an iterative delay value $D_i$;
   determining a trailing edge delay value $D_T$;
   determining a leading edge delay value $D_L$; and
   setting the optimal delay value $D_O$ to an intermediate value between $D_T$ and $D_L$;
   wherein a clock signal of the device has a cycle of a period T,
   wherein determining the trailing edge delay value comprises:
      stopping the device clock signal for a first stoppage interval,
      applying the iterative delay value $D_i$ to the timing of a pulse of the chip select signal,
      determining whether a trailing edge of the pulse has aligned with a positive edge of a cycle of the clock signal,
      if the trailing edge of the pulse has not aligned with the positive edge of the cycle, decrementing the iterative delay value $D_i$ and returning to stopping the device clock signal for the first stoppage interval, and
      if the trailing edge of the pulse has aligned with the positive edge of the cycle, setting the trailing edge delay value $D_T$ to the iterative delay value $D_i$, and
   wherein determining a leading edge delay value comprises:
      stopping the device clock signal for a second stoppage interval,
      applying the iterative delay value $D_i$ to the timing of a pulse of the chip select signal,
      determining whether a leading edge of the pulse has aligned with a positive edge of a cycle of the clock signal,
      if the leading edge of the pulse has not aligned with the positive edge of the cycle, decrementing the iterative delay value $D_i$ and returning to stopping the device clock signal for the second stoppage interval, and
      if the leading edge of the pulse has aligned with the positive edge of the cycle, setting the leading edge delay value $D_L$ to the iterative delay value $D_i$.

2. The method of claim 1, wherein the trailing edge is determined to be aligned with the positive edge and only if contents of a computer bus are successfully captured by the device, and
   wherein the leading edge is determined to be aligned with the positive edge if and only if contents of a computer bus are not successfully captured by the device.

3. The method of claim 1, wherein the trailing edge is determined to be aligned with the positive edge if and only if contents of a computer bus are successfully captured by the device, and
   wherein determining whether a leading edge of the pulse has aligned with the positive edge of a cycle of the clock signal comprises:
      if contents of the computer bus are not successfully captured by the device, determining that the leading edge of the pulse has aligned with the positive edge of the cycle and proceeding directly to determining if the leading edge of the pulse has not aligned with the positive edge of the cycle,
      if contents of the computer bus are successfully captured by the device after the iterative delay value $D_i$ applied to the pulse of the chip select signal, stopping the device clock signal for an earlier stoppage interval, which begins one period T before the second stoppage interval, applying the iterative delay value $D_i$ to the timing of a pulse of the chip select signal, if contents of the computer bus are successfully captured by the device after the iterative delay value $D_i$ applied to the pulse of the chip select signal, setting the leading edge delay value $D_L$ to the iterative delay value $D_i$ and proceeding directly to setting the optimal delay value $D_O$ to the intermediate value between $D_T$ and $D_L$.

4. The method of claim 3, wherein the first and second stoppage intervals both have a duration of 2*T, and wherein the earlier stoppage interval has a duration of 3*T.

5. The method of claim 1, wherein the first and second stoppage intervals both have a duration of 2*T.

6. The method of claim 1, wherein setting an iterative delay value sets $D_i$ to a value equal to or greater than T.

7. The method of claim 1, wherein when the trailing edge of the pulse has not aligned with the positive edge of the cycle and when the leading edge of the pulse has not aligned with the positive edge of the cycle both decrement the iterative delay value $D_i$ by 0.05*T.

8. The method of claim 1, wherein stopping the device clock signal for the first stoppage interval and the second stoppage interval both stop the device clock signal for a stoppage interval using a clock logic, the clock logic comprising a clock gate which receives a memory clock signal and a memory clock gate enable/disable signal, and outputs:
   a cycle of the memory clock signal when the memory clock gate enable/disable signal is a signal to enable, and
   a steady value when the memory clock gate enable/disable signal is a signal to disable.

9. The method of claim 1, wherein applying the iterative delay value $D_i$ to the timing of a pulse of the chip select signal applies the iterative delay value $D_i$ to the CS signal using a CS logic, the CS logic comprising:
   a CS delay chain which receives the iterative delay value $D_i$ and a CS clock signal, and outputs a delayed CS clock signal, and
   a CS transfer logic which receives the CS signal and the delayed CS clock signal, and outputs a delayed CS signal.

10. The method of claim 1, wherein the computer bus is an address bus.

11. The method of claim 1, wherein the device is a memory device comprising one or more dynamic random-access memory (DRAM) chips.

12. A method of claim 1, wherein the optimal delay value $D_O$ is applied to subsequent timing of one or more operations of the chip select signal.

13. A system for training a chip select (CS) to interact with a device, the system comprising a memory controller coupled to the device by a CS signal line and at least one computer bus, the memory controller comprising:
   a CS delay chain configured to apply a selected delay D to a CS clock signal;
   a CS transfer logic coupled to the CS delay chain and configured to time a CS signal to the according to the delayed CS clock signal; and
   a control processor coupled to the CS delay chain to provide the selected delay D, and configured to:
   determine an initial value for an iterative delay value $D_i$,
   determine a trailing edge delay value $D_T$,
   determine a leading edge delay value $D_L$, and
   set an optimal delay value $D_O$ to an intermediate value between $D_T$ and $D_L$,
   wherein a clock signal of the device has a cycle of a period T,
   wherein determining the trailing edge delay value $D_T$ comprises:
   signaling the device to stop the device clock signal for a first stoppage interval,
   providing the iterative delay value $D_i$ as the selected delay D to the CS delay chain during a pulse of the CS signal,
   determining whether a trailing edge of the pulse has aligned with a positive edge of a cycle of the device clock signal,
   if the trailing edge of the pulse has not aligned with the positive edge of the cycle, decrementing the iterative delay value $D_i$ and returning to signaling the device to stop the device clock signal for the first stoppage interval, and
   if the trailing edge of the pulse has aligned with the positive edge of the cycle, setting the trailing edge delay value $D_T$ to the iterative delay value $D_i$.

14. The system of claim 13, wherein determining the leading edge delay value $D_L$, comprises:
   signaling the device to stop the device clock signal for a second stoppage interval,
   providing the iterative delay value $D_i$ as the selected delay D during an additional pulse of the CS signal,
   determining whether a leading edge of the additional pulse has aligned with a positive edge of a cycle of the clock signal,
   if the leading edge of the additional pulse has not aligned with the positive edge of the cycle, decrementing the iterative delay value $D_i$ and returning to signaling the device to stop the device clock signal for a second stoppage interval, and
   if the leading edge of the additional pulse has aligned with the positive edge of the cycle, setting the leading edge delay value $D_L$ to the iterative delay value $D_i$.

15. The system of claim 14, wherein the control processor is further coupled to the device by one or more read data lines, and to a computer bus by one or more write lines,
   wherein determining whether the trailing edge of the pulse has aligned with a positive edge of a cycle of the device clock signal comprises:
   reading contents of the device, and
   if and only if the contents of the device match known contents presently in the computer bus, determining that the trailing edge of the pulse has aligned with the positive edge of the cycle.

16. The system of claim 14, wherein determining whether the leading edge of the additional pulse has aligned with a positive edge of a cycle of the clock signal comprises:
   reading contents of the device,
   if the contents of the device do not match known contents presently in the computer bus, determining that the leading edge of the pulse has aligned with the positive edge of the cycle and proceeding directly to determining if the leading edge of the pulse has not aligned with the positive edge of the cycle,
   if contents of the computer bus match known contents presently in the computer bus, signaling the device to stop the device clock signal for an earlier stoppage interval, which begins one period T before the second stoppage interval,
   writing new known contents to the computer bus, providing the iterative delay value $D_i$ as the selected delay D to the CS delay chain during a pulse of the CS signal, if contents of the computer bus match the new known contents presently in the computer bus, setting the leading edge delay value $D_L$ to the iterative delay value $D_i$ and proceeding directly to setting an optimal delay value $D_O$ to an intermediate value between $D_T$ and $D_L$.

17. The system of claim 13, wherein the memory controller further comprises a clock gate coupled to the control processor and the device, and receiving a memory clock signal, wherein the control processor signals the device to stop the device clock signal by providing a memory clock gate disable signal to the clock gate, and wherein the clock gate supplies the memory clock signal to the device while it is not receiving a disable signal, and supplies a steady value while it is receiving a disable signal.

18. The system of claim 13, wherein the control processor is further configured to provide the optimal delay value $D_O$ as the selected delay D during one or more pulses of the chip select signal.

19. The system of claim 13, wherein the CS delay chain comprises a selective delay circuit, the selective delay circuit comprising:

a plurality of logic devices serving as a delay line, and a tap selection circuit which selectively taps the delay line according to the selected delay D.

20. The system of claim 13, wherein the control processor is further coupled to the CS transfer logic to provide the CS signal.

* * * * *